(12) United States Patent
Deiss et al.

(10) Patent No.: US 12,151,904 B2
(45) Date of Patent: Nov. 26, 2024

(54) GRIPPING UNITS FOR HANDLING DEVICES OF PROCESSING MACHINES

(71) Applicants: TRUMPF Werkzeugmaschinen GmbH + Co. KG, Ditzingen (DE); J. Schmalz GmbH, Glatten (DE)

(72) Inventors: Magnus Deiss, Stuttgart (DE); Thomas Eisele, Alpirsbach-Peterzell (DE); Benjamin Werni, Bondorf (DE)

(73) Assignees: TRUMPF Werkzeugmaschinen SE + Co. KG, Ditzingen (DE); J. Schmalz GmbH, Glatten (DE)

( * ) Notice: Subject to any disclaimer, the term of this patent is extended or adjusted under 35 U.S.C. 154(b) by 526 days.

(21) Appl. No.: 17/512,085

(22) Filed: Oct. 27, 2021

(65) Prior Publication Data
US 2022/0135345 A1 May 5, 2022

(30) Foreign Application Priority Data

Oct. 30, 2020 (DE) .......................... 102020128656.2

(51) Int. Cl.
*B65G 47/91* (2006.01)
*B23Q 3/18* (2006.01)

(52) U.S. Cl.
CPC .............. *B65G 47/91* (2013.01); *B23Q 3/18* (2013.01)

(58) Field of Classification Search
CPC ....... B65G 47/91; B25J 15/0616; B66F 9/183
See application file for complete search history.

(56) References Cited

U.S. PATENT DOCUMENTS

| 4,728,135 | A | 3/1988 | Sugimura et al. |
| 5,192,070 | A | 3/1993 | Nagai et al. |
| 8,074,975 | B2 | 12/2011 | Poike et al. |
| 2006/0242785 | A1* | 11/2006 | Cawley ................. B65G 47/91 |
| | | | 15/321 |

FOREIGN PATENT DOCUMENTS

| DE | 4129289 A1 | 3/1992 |
| DE | 102014215102 A1 | 2/2016 |
| EP | 0607901 A1 | 7/1994 |
| EP | 1967301 A1 | 9/2008 |
| GB | 1193921 A | 6/1970 |
| JP | H03142187 A | 6/1991 |
| JP | 2004203532 A | 7/2004 |
| JP | 5853373 B2 | 2/2016 |

* cited by examiner

*Primary Examiner* — Ronald P Jarrett
(74) *Attorney, Agent, or Firm* — Fish & Richardson P.C.

(57) ABSTRACT

The disclosure relates to gripping units for handling devices of processing machines, e.g., for handling plate-shaped workpieces, including a plurality of vacuum cups that are provided on a main body and are arranged relative to one another to form at least one cup field, and at least one cup field can be subjected to negative pressure for handling the workpiece, wherein at least one holding unit is provided on the main body, the holding unit has at least one sealing element and surrounds at least one cup field, and has at least one actuation unit for applying a negative pressure for the at least one sealing element to act on the plate-shaped workpiece.

18 Claims, 5 Drawing Sheets

GRIPPING UNITS FOR HANDLING DEVICES OF PROCESSING MACHINES

CROSS REFERENCE TO RELATED APPLICATIONS

This application claims priority under 35 U.S.C. § 119 from German Application No. 10 2020 128 656.2, filed on Oct. 30, 2020, the contents of which is incorporated herein by reference in its entirety.

TECHNICAL FIELD

The disclosure relates to gripping units for handling devices of processing machines, e.g., for processing plate-shaped workpieces.

BACKGROUND

A machine assembly for processing plate-shaped workpieces with a processing unit and a handling device for the processed products is known from EP 1 967 301 A1. This processing machine is used for processing plate-shaped workpieces, e.g., metal sheets. For example, processing by way of punching and/or cutting is carried out. For handling the workpieces, the handling device includes a gripping device.

The gripping device has one or more suction plates, with a plurality of vacuum cups being provided on each suction plate. To grip the workpieces, the vacuum cups are placed against the workpiece. A vacuum is then applied, causing the workpiece to be gripped by the vacuum cups. The workpieces can then be handled. Each of these vacuum cups consists of a suction element that acts on the workpiece and a valve for controlling the vacuum cup.

A large-area suction gripper for suctioning and handling workpieces is known from DE 10 2014 215 102 A1. The large-area suction gripper is a closed housing with a firmly integrated gripping plate on which a plurality of suction openings are provided. Inside the housing, sealing bodies are provided, each with a sealing portion. This sealing portion can connect one or more suction openings to the closure body and can apply a negative pressure to these suction openings according to the number of surrounded suction openings. In this way, a plurality of groups of suction openings can be actuated within one gripping plate.

SUMMARY

The present disclosure provides gripping units for handling devices of processing machines, wherein the gripping units enable an adjustment in the holding force for the transport of plate-shaped workpieces.

The gripping devices as disclosed herein include a plurality of vacuum cups on a main body, which are arranged relative to one another to form at least one cup field and the at least one cup field is applied with negative pressure to handle the workpieces, at least one holding unit being provided on the main body, wherein the holding unit has at least one sealing element and surrounds the at least one cup field, and has an actuation unit for applying a further negative pressure for the at least one sealing element to the plate-shaped workpiece.

This assembly has the advantage that, in the case of large forces, for example when loading or transporting a non-processed plate-shaped workpiece, in addition to the vacuum cups of the at least one cup field, the gripping unit is subjectable with a further holding force that is generated by the at least one sealing element of the holding unit, wherein the sealing element surrounds the at least one cup field. Thus, the holding force can be increased by an area that can be applied with negative pressure and that is delimited by the sealing element. The sealing element surrounds the at least one cup field, whereby the additional force can be formed over a larger area than that of the cup field. This arrangement also allows the individual vacuum cups and/or cup fields of the gripping device to be optimally positioned on the plate-shaped workpiece to be handled depending on the geometry.

In one embodiment, a sealing element surrounds all cup fields provided on the main body in an outer circumferential manner. This enables a structurally simple design to increase the holding force. The arrangement and design of the cup fields of a known gripping element and their actuation can be retained in this instance.

Alternatively, an outer circumferential sealing element can be provided for each cup field or at least a group of cup fields. In this way, the actuation of the holding force can be individualised and increased for each cup field.

Furthermore, the actuation unit of the holding unit includes at least one valve for applying a negative pressure, wherein the valve is provided separately from the at least one valve for actuating the vacuum cups in the cup field. This makes it possible to actuate the holding unit as needed while retaining the previous gripping function of the gripping unit.

A further embodiment of the actuation unit provides that the at least one valve of the actuation unit is provided in the cup field or assigned to the cup field. This allows a compact design of the gripping unit to be maintained. For example, the valve of the actuation unit can be integrated at the position of a vacuum cup in a cup field.

The at least one sealing element assigned to the at least one cup field can be provided in a fixed orientation relative to a gripping plane of the vacuum cups. The vacuum cups also can be positioned in a stationary manner in the gripping plane. In this way, an arrangement with reduced installation space can be retained.

Alternatively, the at least one sealing element of the holding unit can be actuated so as to be movable up and down relative to one of the gripping planes formed by the vacuum cups. This arrangement has the advantage that the at least one sealing element is raised relative to the gripping plane of the vacuum cups when not in use. This can result in reduced wear of the at least one sealing element.

In some embodiments, the at least one sealing element of the holding unit is actuated by a drive so that the sealing element is movable vertically on the main body, wherein the sealing element is arranged in a starting position above the gripping plane formed by the vacuum cups. By means of the drive, the sealing element can be transferred into a gripping position that lies in the gripping plane of the vacuum cups or is positioned protruding from the gripping plane of the vacuum cups. This arrangement and configuration enables the at least one sealing element to rest securely against and grip the plate-shaped workpiece to be handled to generate an additional holding force. Individual cup fields can also be moved with their vacuum cups from a non-use position into a gripping position. This individual actuation of the vacuum cups and/or cup fields also allows reshaped plate-shaped workpieces to be gripped.

Advantageously, after the at least one cup field of the gripping unit has been placed on the plate-shaped workpiece to be handled, the at least one sealing element is transferable into a gripping position, wherein the vacuum cups of the at least one cup field and the at least one sealing element can be successively subjected to negative pressure. Alternatively, the vacuum cups of the at least one cup field placed on the plate-shaped workpiece and the at least one sealing element can also be simultaneously subjected to negative pressure. In the latter case, a shortening of a process cycle can be achieved.

According to an embodiment of the gripping unit, the drive for the at least one sealing element movable up and down is designed, for example, as a reciprocating piston drive, e.g., a pneumatic cylinder, as a linear drive, as an electromotive drive, or as an electromagnetic drive. In some embodiments, at least two reciprocating piston drives are provided, which act on the one hand on the main body and on the other hand on a holding frame that receives the sealing element, to actuate an up and down movement of the sealing element.

In one embodiment, the at least one sealing element of the holding unit is designed as a circumferential sealing lip. According to a first embodiment, this sealing lip can be made of a thermoplastic elastomer. It is also possible that such a sealing lip is formed from a foam material. For example, the design of the foam material can enable a simple adaptation of the geometry of the sealing element to the structural contours of the main body.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Further features and their functionalities result from the following description of embodiments on the basis of the figures.

DETAILED DESCRIPTION

Figure 1:
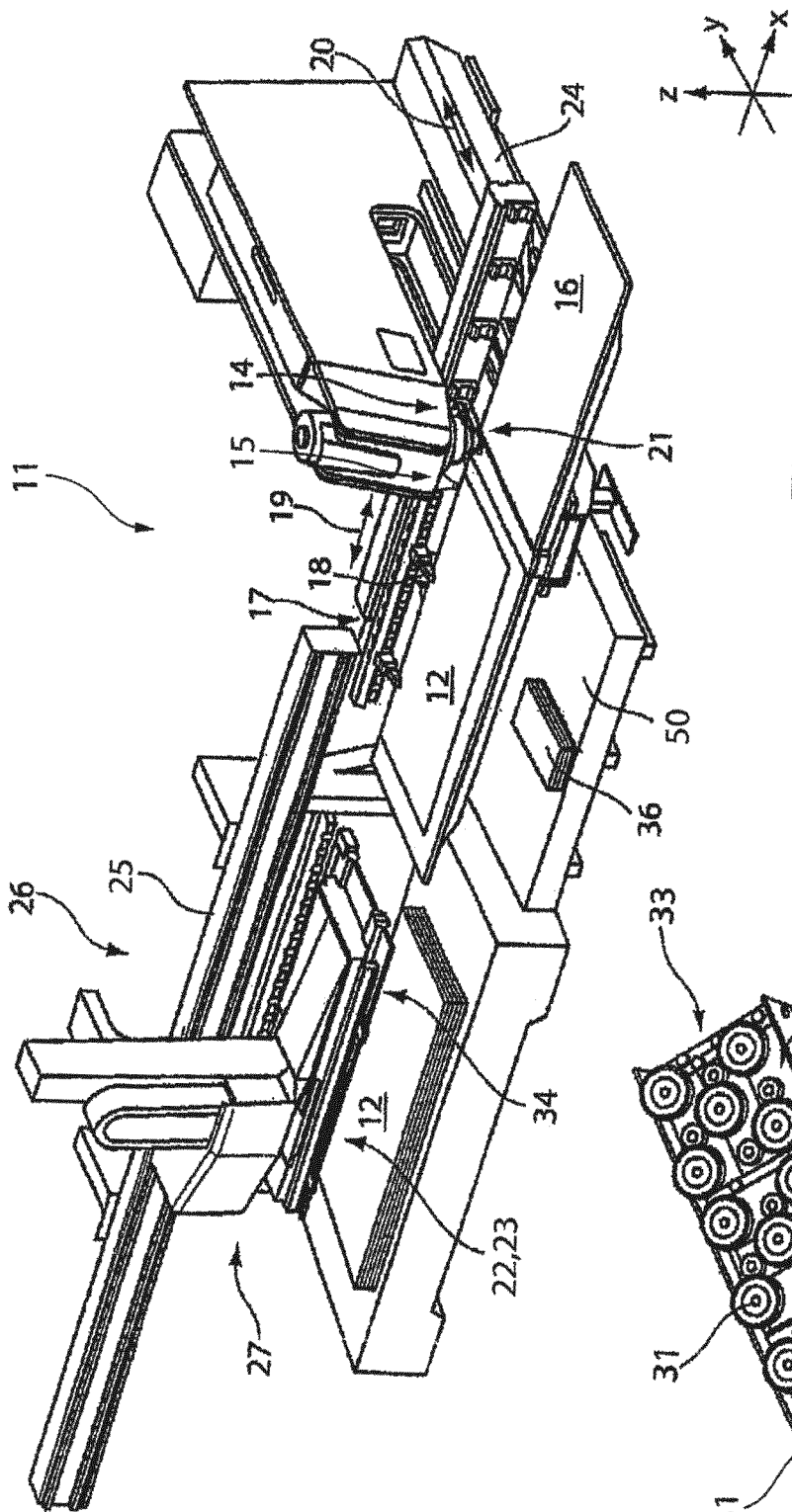
FIG. 1 is a perspective view of a processing machine and a handling device with a gripping device including vacuum cups according to the prior art.

FIG. 1 shows a processing machine 11 in perspective, which is designed, for example, as a punching machine. A processing unit 21, e.g., a stationary processing unit 21, with a punching head 14 and with a punching die (not shown in more detail) is provided for separation-based processing of a plate-shaped workpiece 12, for example in the form of a metal sheet. Alternatively, a laser punching machine can also be used. Such laser punching machine additionally comprises a laser processing head 15 provided adjacently to the punching head 14. The workpiece 12 to be processed rests on a workpiece support 16 during workpiece processing. The workpiece 12 is held during processing by a holding unit 17, which can include clamps 18, and can be moved relative to the punching head 14 in the X direction of the workpiece plane (X/Y plane) by means of a conventional linear drive 19 indicated by an arrow. In the Y-direction of the workpiece plane, the workpiece 12 can be moved by moving the workpiece support 16 together with the holding unit 17 relative to a base 24, on which the workpiece support 16 is mounted, by means of a conventional linear drive 20 indicated by an arrow. In this way, the workpiece 12 can be moved in the X and Y directions relative to the punching head 14 so that the region of the workpiece 12 to be processed can be positioned in the processing region of the punching head 14. The processing region is located between the punching head 14 and a punching die that is not shown in more detail and can be exchanged. Accordingly, laser optics can be arranged in the stationary processing region of the laser processing head 15 in a laser punching machine.

For the workpiece support 16 of the processing machine 11, a handling unit 26 is provided at one end, which also includes a gripping unit 27 that can be moved along at least one linear axis 25 from a loading and unloading position 22, 23 for the plate-shaped material 12 into a removal position or waiting position, to pick up a processed workpiece 36 and, for example, guide it out of the processing machine 11 or deposit it in a magazine 50. The gripping unit 27 has fastening elements and/or fastening portions 34 on its upper side (as shown in FIG. 3).

The processing machine 11 can alternatively also be designed as a laser processing machine or a laser punching processing machine that instead of an open main body has a closed main body, e.g., a circumferential frame, and optionally extends in the Y-direction.

Figure 2:
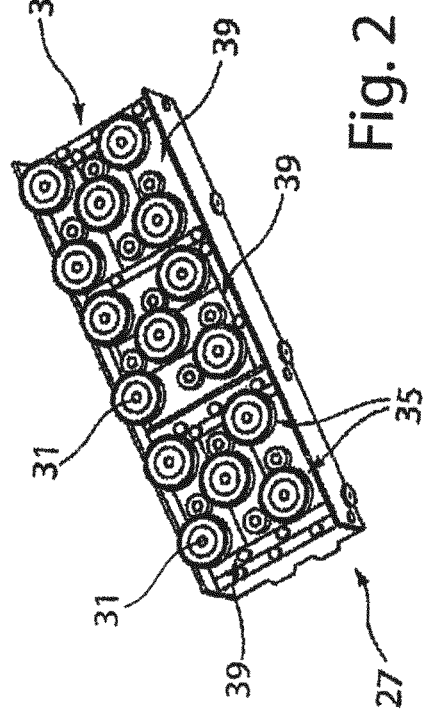
FIG. 2 is a schematic view from below of a suction plate of the gripping device in FIG. 1 according to the prior art.

FIG. 2 shows a perspective view from below of a gripping unit 27 according to the prior art. This gripping unit 27 includes a main body 33 that includes, for example, three cup fields 39, within which one or more suction elements 31 are provided. In the embodiment shown, for example, five vacuum cups 35 are assigned to one another in a cup field 39. These vacuum cups 35 are jointly actuated by a valve that is not shown in more detail, with a negative pressure to generate a holding force to a plate-shaped workpiece 12.

Figure 3:
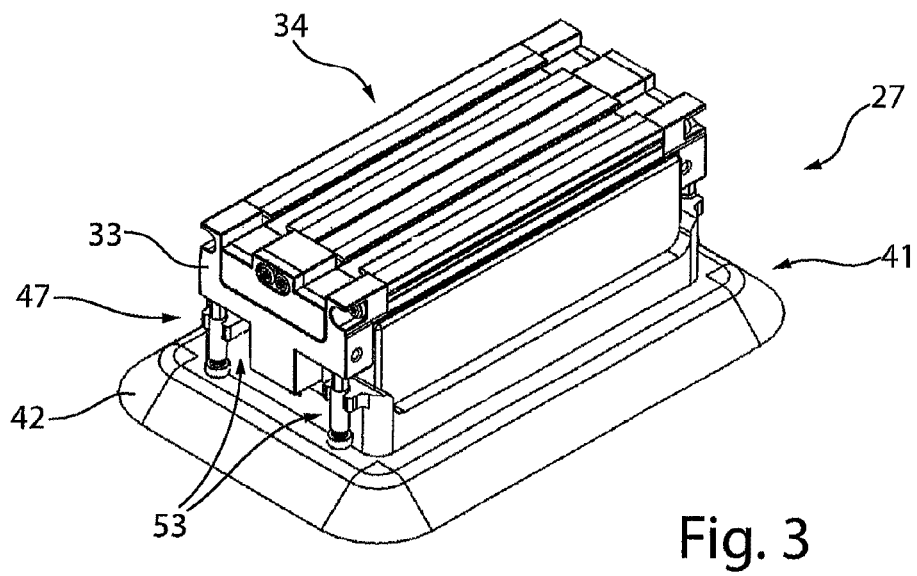
FIG. 3 is a perspective view of a gripping device as described herein.
Figure 4:
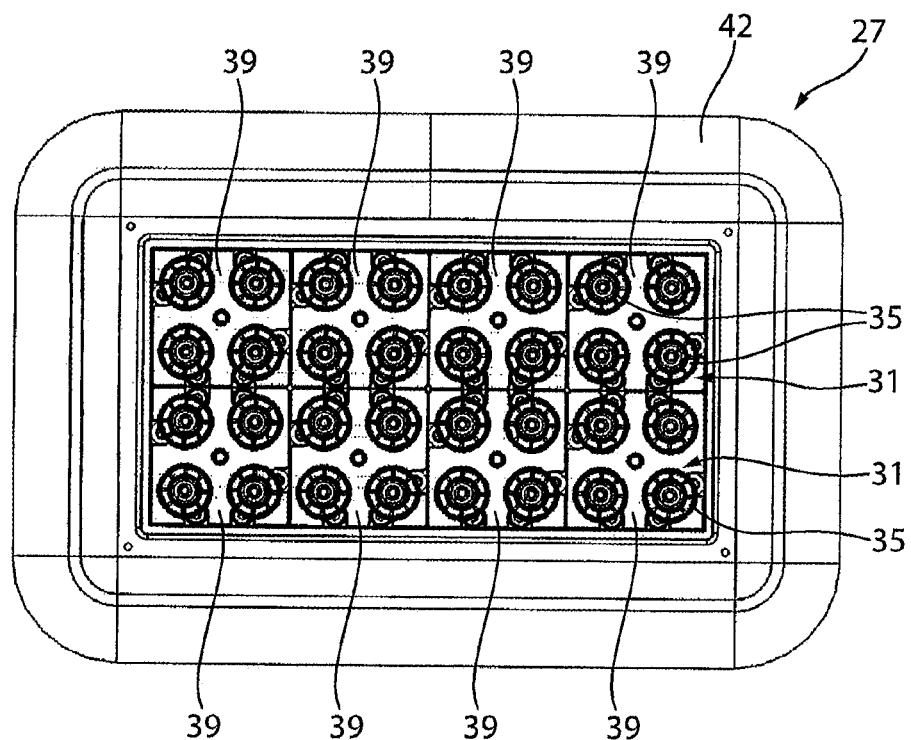
FIG. 4 is a schematic view from below of the gripping device according to FIG. 3.
Figure 5:
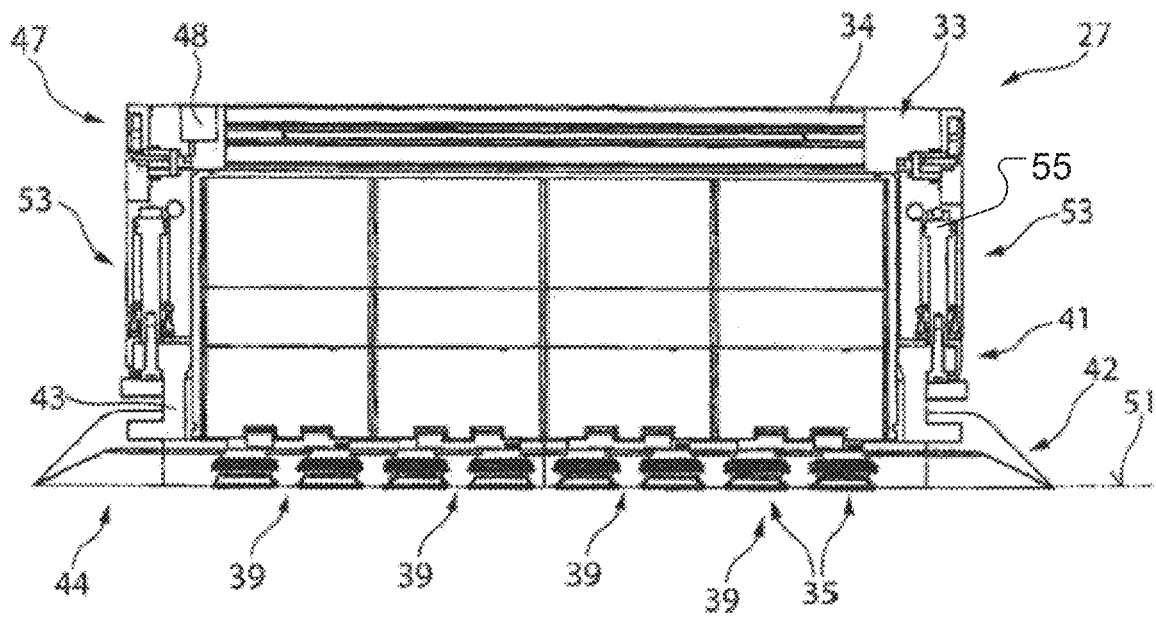
FIG. 5 is a schematic side view of the gripping device according to FIG. 3 with an additional holding unit in a starting position.

FIG. 3 shows a perspective view of an improved gripping unit 27 as described herein. FIG. 4 shows a schematic view from below of the gripping unit according to FIG. 3. FIG. 5 shows a schematic sectional view of the gripping unit 27 according to FIG. 3.

Figure 9:
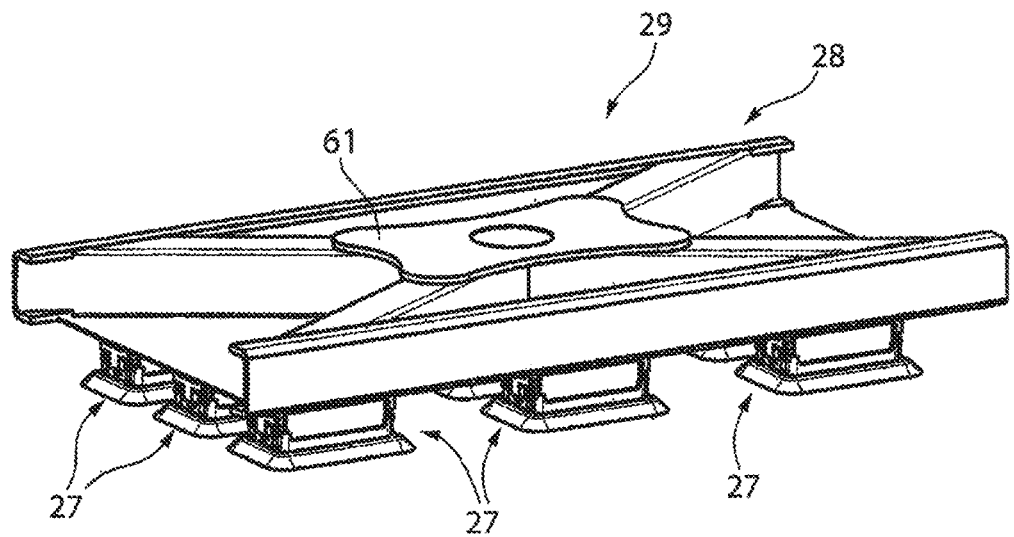
FIG. 9 is a perspective view of a gripping device with a plurality of gripping units according to FIG. 3.

The gripping unit 27 includes a main body 33 that has fastening elements and/or fastening portions 34 on its upper side, for example, to fix the gripping unit 27 to a gripping frame 28 of a gripping device 29 (FIG. 9). The view according to FIG. 4 shows that this gripping unit 27 includes, for example, eight cup fields 39, with each cup field 39 being assigned, for example, four vacuum cups 35.

A holding unit 41 is provided on the gripping unit 27 and includes a sealing element 42 and an actuation unit 47. This actuation unit 47 consists of at least one drive 53 and at least one valve 48 (FIG. 5), via which a negative pressure for the sealing element 42 can be actuated. This valve 48 is actuated by a control system, not shown in more detail. This control system, which is not shown in more detail, can also actuate the vacuum cups 35 of the cup field 39.

According to the embodiment shown, the sealing element 42 is shown as an outer circumferential sealing element 42 that surrounds all cup fields 39 of the gripping unit 27.

As illustrated in FIG. 5, the circumferential sealing element 42 is held by a holding frame 43. This holding frame 43 is guided so as to be movable up and down relative to the main body 33. To actuate this up and down movement, the actuation unit 47 has a drive 53, one end of which is firmly mounted on the main body 33 and an opposite end of which engages the holding frame 43. In an embodiment, this drive 53 is designed as a reciprocating piston drive. Advantageously, a plurality of pneumatic lifting cylinders 55 are used to actuate a uniform up and down movement of the sealing element 42. The drive 53 can be actuated by the control system, which is not shown in more detail, and is coordinated with the operation of the at least one valve for the sealing element 42 and the valves for actuating the vacuum cups 35.

This circumferential sealing element 42 is shown according to FIG. 5 in the starting position 44. The vacuum cups 35 are also positioned in a starting position in the embodiment shown in FIG. 5. The vacuum cups 35 assigned to one another to form a cup field 39 can be moved vertically from the rest position shown to the gripping position 45, as shown for example in FIGS. 6 and 7. Each cup field 39 can be actuated individually. When handling a flat plate-shaped workpiece 12, all cup fields 39 can be positioned in the rest position shown in FIG. 5 or all in an extended gripping position 45. If a plate-shaped workpiece 12 is to be gripped and has been processed by reshaping, e.g., and has projections or protrusions, only individual cup fields 39 may be transferred to the gripping position 45, as shown for example in FIG. 6.

According to one embodiment, for example, all vacuum cups 35 can be arranged in the starting position 44, as shown in FIG. 5. If plate-shaped workpieces 12 with a lower weight are to be handled, vacuum cups 35 of the cup fields 39 can be actuated. For example, individual cup fields 39 can be actuated if other cup fields 39 are located in a recess or a clearance of the plate-shaped workpiece 12 and thus cannot assume a gripping function. When handling plate-shaped workpieces 12 with a higher weight, the sealing element 42 in addition to the vacuum cups 35 may also be subjected to negative pressure.

Figure 6:
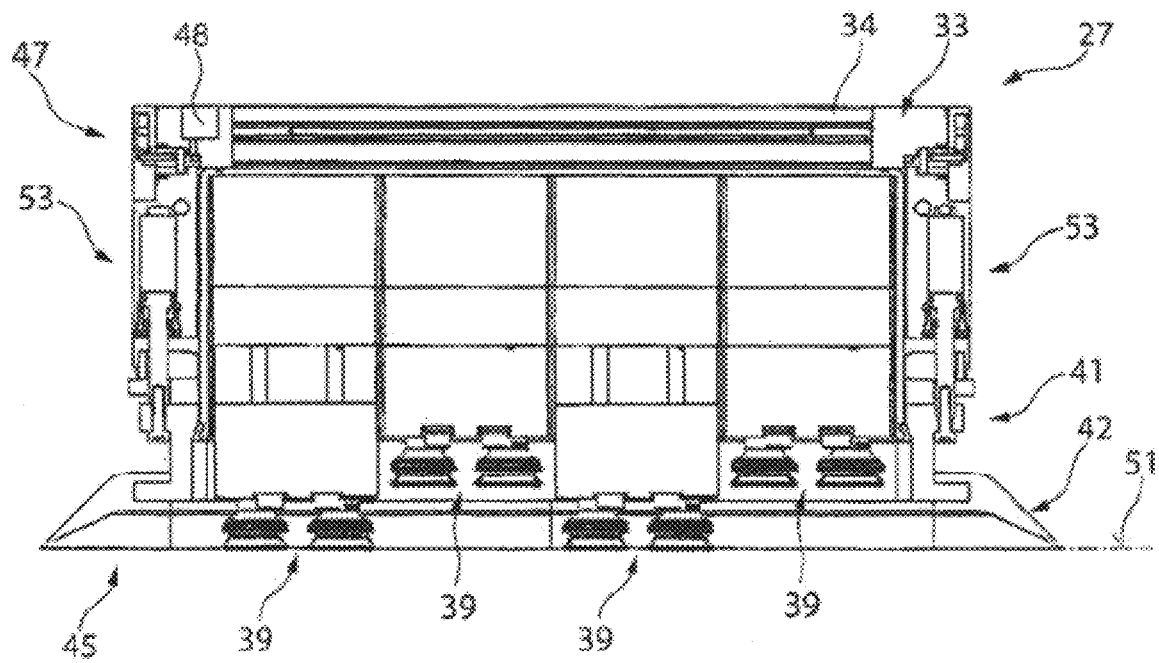
FIG. 6 is a schematic sectional view of the gripping device according to FIG. 5 with the holding unit in a gripping position.

FIG. 6 shows a sectional view of the gripping unit 27, in which the sealing element 42 and individual cup fields 39 are transferred to the gripping position 45. When positioning the sealing element 42 in the gripping position 45, in which the sealing element 42 lies in the gripping plane 51 of the vacuum cups 35, an actuation can be provided for handling the plate-shaped workpiece according to a first embodiment, in which the vacuum cups 35 are first subjected to negative pressure and then the sealing element 42 is subjected to negative pressure. Individual cup fields 39 of the gripping unit 27 can also be subjected to negative pressure, with the selection of the actuation of the cup fields 39 being adapted to the geometry of the plate-shaped workpiece 12 to be handled. For example, the plate-shaped workpiece to be handled can have a recess or a hollow that is assigned to a cup field 39, so that it is not necessary to apply negative pressure to this cup field 39.

Figure 7:
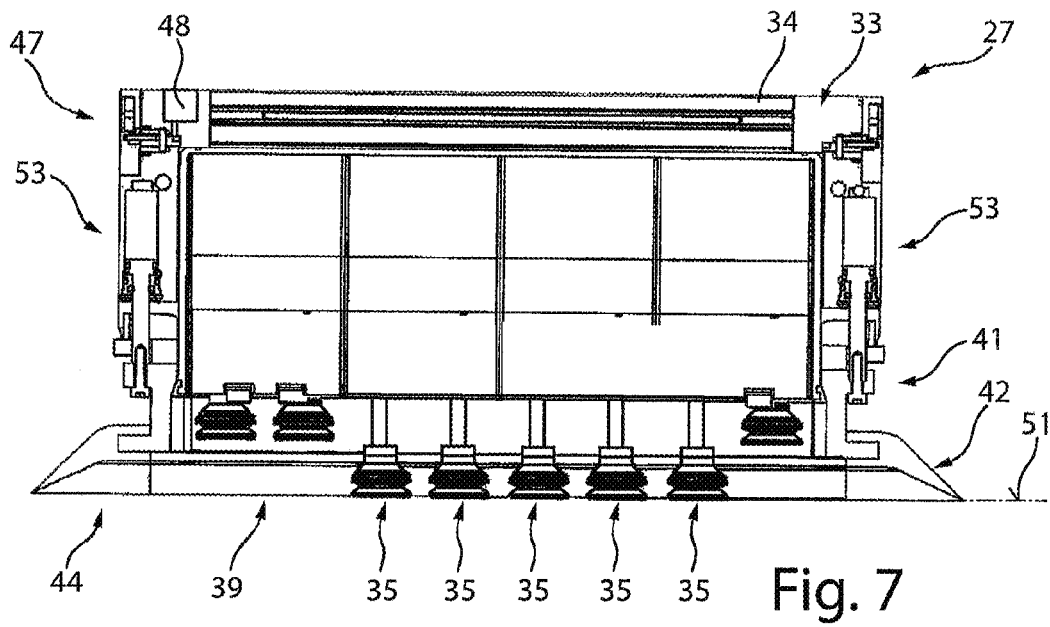
FIG. 7 is a schematic view of the gripping device according to FIG. 6 in a further configuration in a gripping position.

FIG. 7 shows a sectional view of the gripping unit 27 in a further alternative embodiment and gripping position 45. In this embodiment, instead of individual cup fields 39, as shown in FIG. 6, only individual vacuum cups 35 can be transferred to a gripping position 45. This arrangement has the advantage that the individual vacuum cups 35 are transferred to the gripping position 45 in adaptation to the geometry of the plate-shaped workpiece 12 to be handled. In this transferred gripping position 45, a vacuum is also applied to these vacuum cups 35. The vacuum cups 35 that are not extended can remain stationary.

A combination of the embodiment according to FIGS. 6 and 7 can also be possible, so that individual cup fields 39 are transferred to the gripping position 45 and individual vacuum cups 35 adjacent to the cup fields 39 can be transferred to the gripping position 45.

Alternatively, the holding device 41 of the gripping unit 27 can be actuated in such a way that the at least one sealing element 42 is positioned so as to protrude with respect to the cup fields 39 with the vacuum cup 35, so that only the sealing element 42 rests against the plate-shaped workpiece 12 to be handled, without the vacuum cups 35 of the at least one cup field 39 being subjected to negative pressure.

In the above-described embodiment example, the sealing element 42 can be formed as a sealing lip. A thermoplastic elastomer can be used for the sealing lip.

Figure 8:
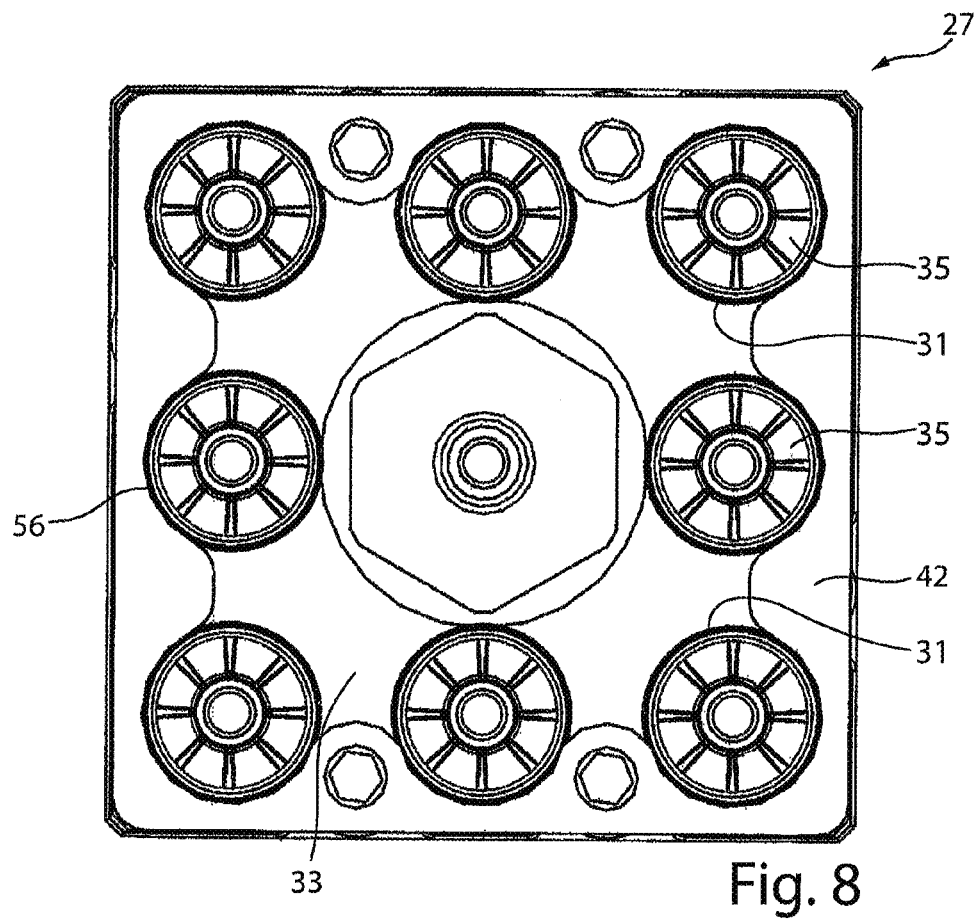
FIG. 8 is a schematic view from below of an alternative embodiment of the gripping unit according to FIG. 3.

FIG. 8 shows an alternative embodiment of the gripping unit 27. This gripping unit 27 includes, for example, nine vacuum cups that are assigned to one another within, for example, a square base area of the gripping unit 27. The sealing element 42 is provided around the outside circumferentially. This sealing element 42 can be adapted to the square contour of the main body 33. Furthermore, the sealing element 42 can extend at least in portions between two adjacent vacuum cups 35 into the intermediate space. This can create an enlarged sealing area.

The sealing element thus has semi-circular recesses 56 towards which the vacuum cups 35 are oriented. In this embodiment, the sealing element 42 is made of foam. This allows an inner circumferential surface of the sealing element 42 to be introduced in a simple manner into these semi-circular recesses 56 or three-quarter-circular indentations in the corner region of the sealing element 42.

FIG. 9 shows a perspective view of a gripping device 29 with a plurality of gripping units 27. This gripping device 29 includes a gripping receptacle 28 on which a mounting flange 61 is provided for attachment to the handling unit 26. The gripping units 27 can be arranged in a grid dimension, e.g., in rows and columns, on the gripping receptacle 28. These gripping units 27 are fixed in their position and are not provided to be movable on the gripping receptacle 28.

Figure 10:
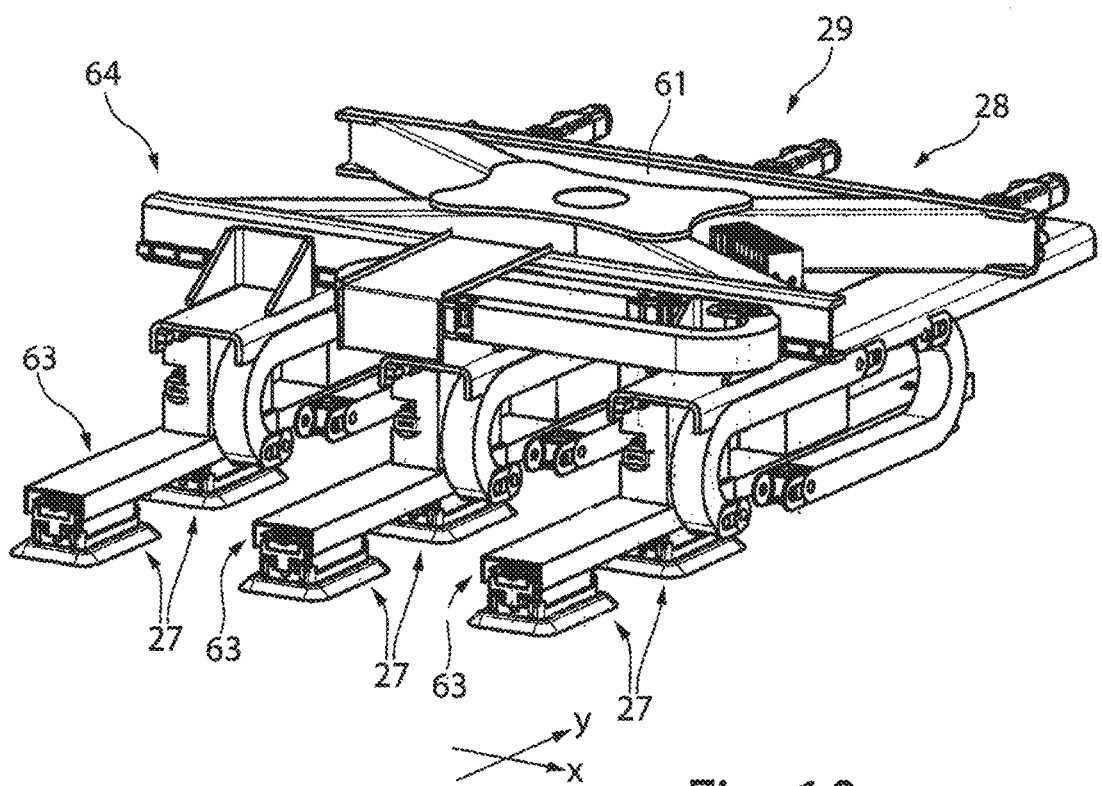
FIG. 10 is a perspective view of an alternative embodiment of the gripping device according to FIG. 9 with a plurality of gripping units according to FIG. 3.

FIG. 10 shows an alternative design of the gripping device 29 to FIG. 9. In this embodiment, linear axes 63 are provided on the gripper holder 28 of the gripping device 29 that can be individually actuated with respect to a direction of travel, e.g., in the Y-direction. The gripping units 27 are provided on these linear axes 63, and, for example, the gripping units 27 can be changed along the length of the linear axes 63 and/or at a distance from one another.

The linear axes 63 can also be provided on at least one further linear axis 64 oriented at right angles thereto, by means of which the distance between the gripping units 27 can be moved in the X-direction. In addition, the linear axes 63 carrying the gripping unit 27 can be received by the at least one further linear axis 64 so that their distance from each other can be changed.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A gripping unit for a handling device of a processing machine for handling plate-shaped workpieces, the gripping unit comprising:
   a main body;
   a plurality of vacuum cups provided on the main body, wherein the plurality of vacuum cups are arranged relative to one another to form at least one cup field, wherein during use the at least one cup field is provided with a first negative pressure for handling the workpiece, wherein the plurality of vacuum cups or the at least one cup field is configured to move vertically relative to the main body between a starting position and a gripping position; and
   at least one holding unit provided on the main body, wherein the at least one holding unit surrounds at least one cup field and comprises:
      at least one sealing element provided on the main body and configured to move relative to a gripping plane formed by the plurality of vacuum cups, wherein the sealing element is an outer circumferential sealing element that provides a seal around the at least one cup field, and
      at least one actuator that applies a second negative pressure for the at least one sealing element to act on the plate-shaped workpiece, wherein the actuator comprises a drive configured to move the at least one sealing element vertically on the main body,
   wherein when in the starting position, the at least one sealing element is arranged above the gripping plane formed by the vacuum cups, and when in the gripping position, the at least one sealing element is arranged to be positionable in the gripping plane formed by the vacuum cups or to protrude relative to the gripping plane.

2. The gripping unit of claim 1, wherein the sealing element is an outer circumferential sealing element.

3. The gripping unit of claim 1, wherein the at least one cup field provided on the main body comprises a plurality of cup fields arranged inside the sealing element.

4. The gripping unit of claim 1, wherein the sealing element is provided on the main body for each cup field of the at least one cup field or for at least one group comprising a plurality of cup fields.

5. The gripping unit of claim 1, wherein the at least one actuator comprises at least one valve for applying a vacuum, wherein the actuator is actuatable separately from the at least one valve for actuating at least one of the plurality of vacuum cups or the at least one cup field, or both at least one of the vacuum cups and the at least one cup field.

6. The gripping unit of claim 5, wherein the at least one valve of the actuator is provided in the cup field or is assigned to the cup field surrounded by the sealing element.

7. The gripping unit of claim 1, wherein the at least one sealing element is arranged on the main body in a fixed orientation relative to a gripping plane formed by the vacuum cups.

8. The gripping unit of claim 7, wherein after the at least one cup field and the at least one sealing element have been placed on the workpiece to be handled, the at least one sealing element is transferable into a gripping position, and the vacuum cups of the at least one cup field and the sealing element, or both, are configured to have a negative pressure applied during use.

9. The gripping unit of claim 8, wherein the negative pressure is applied to both the vacuum cups and the sealing element simultaneously.

10. The gripping unit of claim 8, wherein the negative pressure is applied first to the vacuum cups and then subsequently to the sealing element.

11. The gripping unit of claim 1, wherein the drive comprises a reciprocating piston drive, a linear drive, an electromotive drive, or an electromagnetic drive.

12. The gripping unit of claim 1, wherein after the at least one cup field has been placed on the workpiece to be handled, the at least one sealing element is transferable into a gripping position, and the vacuum cups of the at least one cup field and the sealing element, or both, are configured to have a negative pressure applied.

13. The gripping unit of claim 12, wherein the negative pressure is applied to both the vacuum cups and the sealing element simultaneously.

14. The gripping unit of claim 12, wherein the negative pressure is applied first to the vacuum cups and then subsequently to the sealing element.

15. The gripping unit of claim 12, wherein the at least one sealing element is transferable into the gripping position by a drive comprising a pneumatic cylinder.

16. The gripping unit of claim 1, wherein the sealing element comprises a circumferential sealing lip.

17. The gripping unit of claim 1, wherein the sealing element comprises an elastic material.

18. The gripping unit of claim 1, wherein the sealing element comprises an elastomer or a foam.

* * * * *